US007411123B2

(12) United States Patent
Chang

(10) Patent No.: US 7,411,123 B2
(45) Date of Patent: Aug. 12, 2008

(54) METHOD FOR TRANSFORMING IMAGE INTO MUSIC

(75) Inventor: Chia-Kai Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 864 days.

(21) Appl. No.: 10/904,030

(22) Filed: Oct. 20, 2004

(65) Prior Publication Data

US 2006/0009976 A1 Jan. 12, 2006

(30) Foreign Application Priority Data

Jun. 25, 2004 (TW) .............................. 93118437 A

(51) Int. Cl.
*G09B 15/00* (2006.01)
*G09B 15/02* (2006.01)
*G10H 1/00* (2006.01)

(52) U.S. Cl. ......................... 84/477 R; 84/600; 84/609; 84/610; 84/649; 84/650

(58) Field of Classification Search ....................... None
See application file for complete search history.

(56) References Cited

U.S. PATENT DOCUMENTS 5,400,687 A * 3/1995 Ishii ......................... 84/477 R
2002/0088334 A1 * 7/2002 Mohammad Beigi ........ 84/478
2004/0139845 A1 * 7/2004 Tohgi et al. ................... 84/600

* cited by examiner

*Primary Examiner*—Marlon T Fletcher
(74) *Attorney, Agent, or Firm*—Jianq Chyun IP Office

(57) ABSTRACT

The invention is a method for transforming image into music, more particularly, is a method for transforming image into sound at first and then editing the sound into music. In the method, the dynamic image or static image is captured by using the image capture apparatus. An image datum is obtained from the dynamic image or the static image and the image datum is compared with a plurality of standards stored in the memory to obtain a first music, wherein the image datum may be a brightness value or a pixel value. Then, the first music is transferred into a plurality of the third music with various styles by performing a function transferring process and a randomly selecting music notes process. The third music is broadcasted.

27 Claims, 9 Drawing Sheets

METHOD FOR TRANSFORMING IMAGE INTO MUSIC

CROSS-REFERENCE TO RELATED APPLICATION

This application claims the priority benefit of Taiwan application Ser. No. 93118437, filed Jun. 25, 2004.

BACKGROUND OF THE INVENTION

1. Field of Invention

The present invention relates a method for transforming image into music. More particularly, the present invention relates to a method for transforming image into sound and then editing the sound into music.

2. Description of Related Art

A mini-digital camera, such as an image capture apparatus as well as photo/image sensor or lens, installed in a mobile electronic equipment, such as a mobile phone, a pocket personal computer (pocket PC), a personal digital assistant (PDA) or portable personal computer (portable PC), is commercially available. Therefore, how to utilize mini-digital camera to increase the value of the mobile electronic equipment becomes a main research course.

FIGS. 1 and 2 are flow charts showing a conventional technology for transforming image datum into music, wherein the technology is disclosed by Taiwan Patent No. 921 341 50, entitled "Method for Using Image Datum To Produce Music" (filing date: Dec. $4^{th}$, 2003). In this conventional technology, a dynamic/static image is captured (step S102/step S202).

Referring to FIG. 1, if the captured image is a dynamic image (as shown in step S102), according to the dynamic image, an analysis process is performed to obtain a plurality of static images (step S104), and then an image parameter is obtained from one of these static images (step S106). Thereafter, the obtained image parameter is compared with a plurality of built-in standards and then at least one musical-note signal or rhythm signal is obtained (step S108). The musical-note signal can be sent out by a played music instrument or synthesized from various played music instruments. Further, the rhythm signal can be sounded from knocking stuff such as playing drums. The musical-note signal is output to be played (step S110) or is stored in the memory until a lot of the musical-note signal are collected in the memory (step S112) and then the musical-note signals are editing into a musical composition (step S114) and then the musical composition is played (step S116).

Referring to FIG. 2, if the captured image is a static image (as shown in step S202), according to the static image, an analysis process is performed to obtain a plurality of image parameters (step S204). Thereafter, one of the obtained image parameters is compared with a plurality of built-in standards (step S206) and then at least one musical-note signal or rhythm signal is obtained (step S208). The musical-note signal is output to be played (step S210) or is stored in the memory until a lot of the musical-note signal are collected in the memory (step S212) and then the musical-note signals are editing into a musical composition (step S214) and then the musical composition is played (step S216).

In the conventional technology, the dynamic image datum or the static image datum can be transformed into music by comparing the image parameter with the content of the memory. Although the image datum can be converted into music successfully, the music produced by this way may not be a melody and could be only a kind of sound. Therefore, the produced music can be a kind of trouble for the user.

SUMMARY OF THE INVENTION

Accordingly, at least one objective of the present invention is to provide a method for transforming image datum into sound and then editing the sound into music. In the present invention, a dynamic image datum or a static image datum is captured. Thereafter, a comparison process for comparing the data with the content of the memory and a function transforming process are performed to automatically transform and edit image datum into a melody to achieve the goal of entertaining users.

At least a second objective of the present invention is to provide a method for transforming image datum into sound and then editing the sound into music, wherein the captured image can be transformed into melody by performing a comparison process and a function transferring process. Therefore, the function of the image capture apparatus equipped with the mobile electronic equipment can be extended.

To achieve these and other advantages and in accordance with the purpose of the invention, as embodied and broadly described herein, the invention provides a method for transforming image datum into sound and then editing the sound into music. The method comprises steps of capturing a dynamic or static image by an image capture apparatus. The image capture apparatus can be, for example, a photo sensing device or a lens. If the captured image is a static image, an image datum is obtained from the static image. If the captured image is a dynamic image, a plurality of static images can be extracted from the dynamic image and an image datum can be obtained from one of these static images. The obtained image from the captured dynamic image or the captured static image is compared with a plurality of standards in the memory to determine a content of a first music. A portion of the first music is acquired randomly to be a second music, wherein the second music includes a plurality of consecutive and adjacent music notes of a portion of the first music. The second music is stored in the memory to be a part of a third music, wherein the length of the second music in time is changed by inserting additional music notes and the third music possesses a fixed length in time. A location of the second music in the third music is located to determine end points of the second music and then one of a first music note from a first end point of the second music and a second music note from a second end point of the second music is selected or the first music note and the second music note are selected simultaneously to finish the third music. The first music note is the first music note in the time scale of the second music and the second music note is the final music note in the time scale of the second music. When the second music is stored in the memory and the first music note is the first music note played in the time scale of the third music, a plurality of third music notes which are consecutive and adjacent to each other are acquired from the first music to be stored in the memory, wherein the third music notes are located adjacent to the second music note in the first music and are played right after the second music note is played. The third music notes are stored right after the second music and adjacent to the second music note to form a portion of the second music and a portion of the third music, wherein the second music comprises the third music notes. The length in time of the second music is determined whether it is equal to that of the third music. When the length in time of the second music is equal to that of the third music, the third music is broadcasted. When the second music is stored in the memory and the second music note is the final music note played in the time scale of the third music, a plurality of fourth music notes which are consecutive and adjacent to each other are acquired from the first music to be stored in the memory, wherein the fourth music notes are located adjacent to the first music note in the first music and are played right before the first music note is played. The fourth music notes are stored right before the second music and adjacent to the first music note to form a portion of the second music and a portion of the third music, wherein the second music comprises the fourth music notes. The length in time of the second music is determined whether it is equal to that of the third music. When the length in time of the second music is equal to that of the third music, the third music is broadcasted. When the second music is stored in the memory and neither the first music note is the first music note played in the time scale of the third music nor the second music note is the final music note played in the time scale of the third music, a plurality of fifth music notes which are consecutive and adjacent to each other are acquired from the first music to be stored in the memory, wherein the fifth music notes are located adjacent to the first music note in the first music and are played right before the first music note is played. Meanwhile, a plurality of sixth music notes which are consecutive and adjacent to each other are acquired from the first music to be stored in the memory, wherein the sixth music notes are located adjacent to the second music note in the first music and are played right after the second music note is played. The fifth music notes are stored right before the second music and adjacent to the first music note and the sixth music notes are stored right after the second music and adjacent to the second music note to form a portion of the second music and a portion of the third music, wherein the second music comprises the fifth and the sixth music notes. The length in time of the second music is determined whether it is equal to that of the third music. When the length in time of the second music is equal to that of the third music, the third music is broadcasted. In the present invention, a dynamic image datum or a static image datum is captured. Thereafter, a comparison process for comparing the data with the content of the memory and a function transforming process are performed to automatically transform and edit image datum into a melody to achieve the goal of entertaining users and to extend the function of the image capture apparatus equipped with the mobile electronic equipment.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
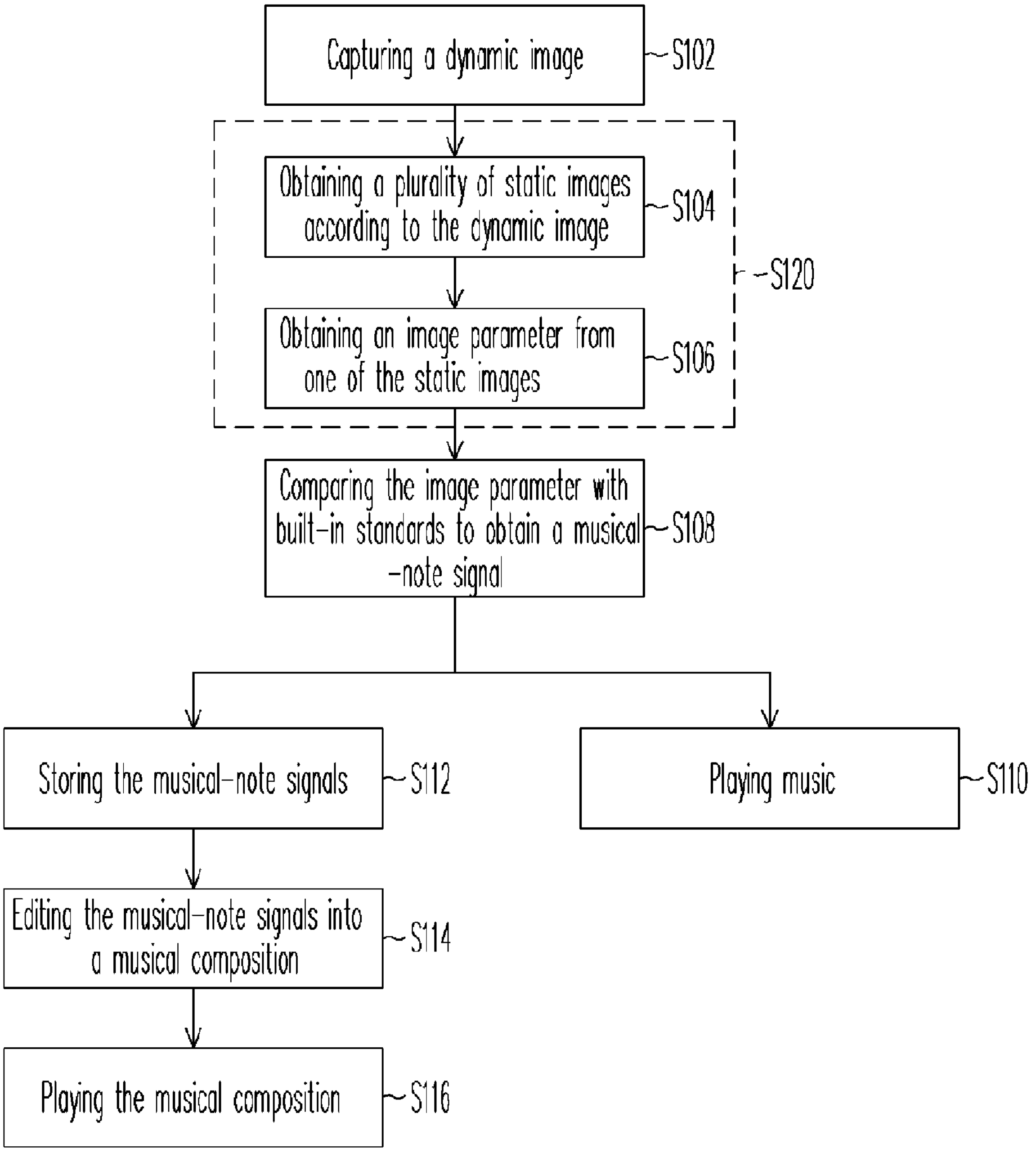
FIG. 1 is a flow chart showing a conventional technology for transforming dynamic image into music.
Figure 2:
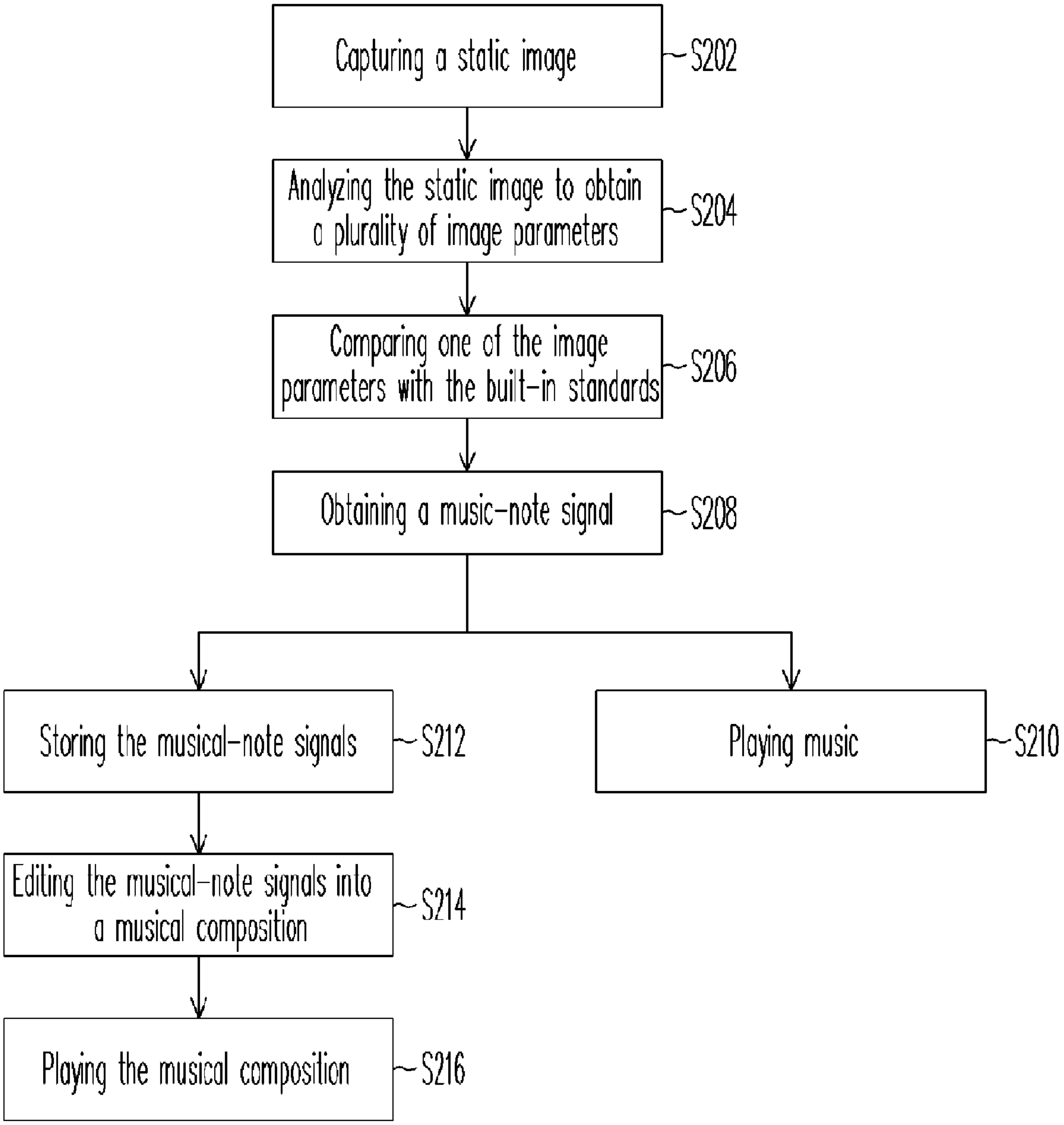
FIG. 2 is a flow chart showing a conventional technology for transforming static image into music.

Reference will now be made in detail to the present preferred embodiments of the invention, examples of which are illustrated in the accompanying drawings. Wherever possible, the same reference numbers are used in the drawings and the description to refer to the same or like parts.

Figure 3:
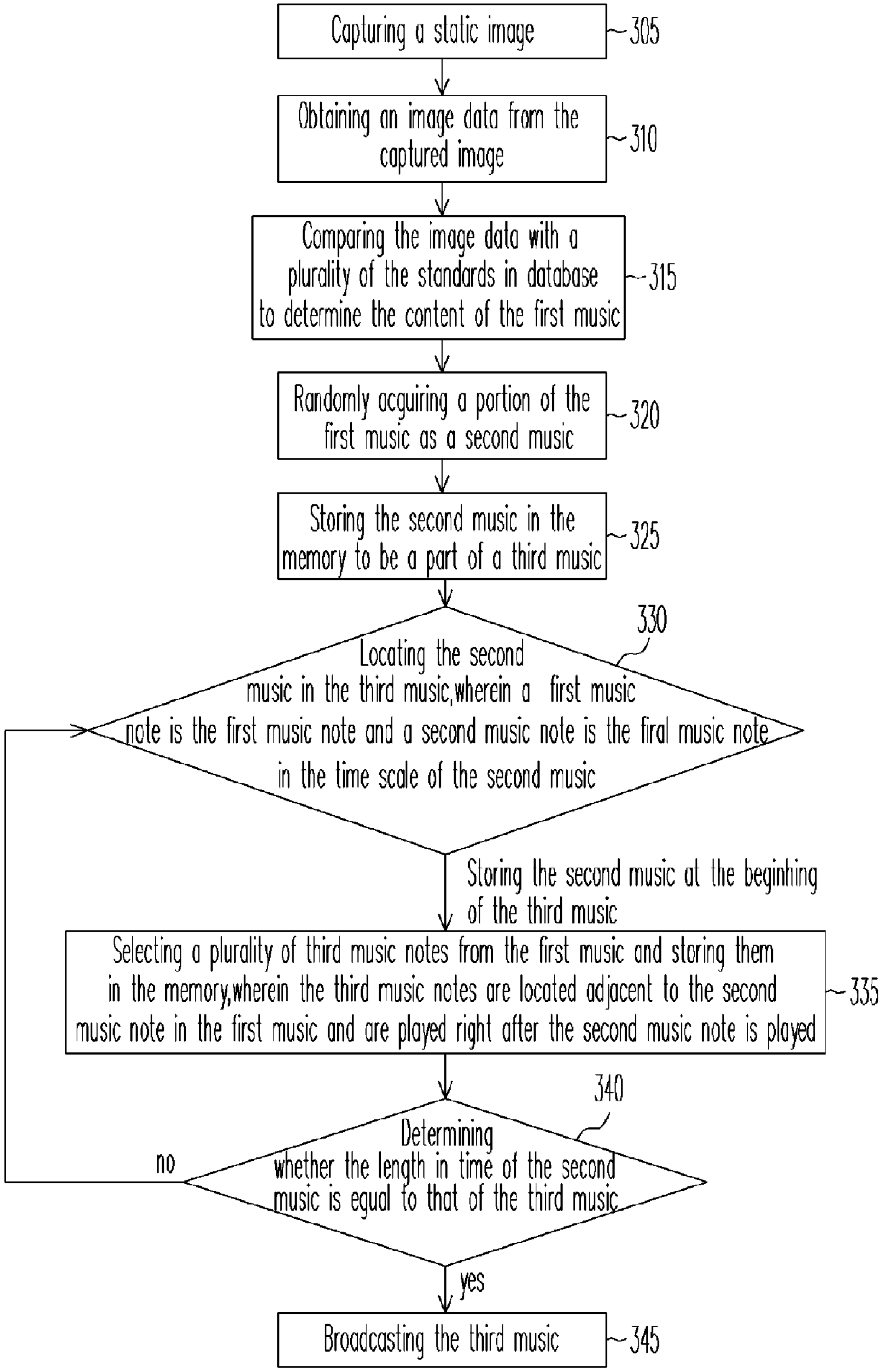
FIG. 3 is a flow chart schematically illustrating a method of transforming static image into music according to a preferred embodiment of the invention.
Figure 4:
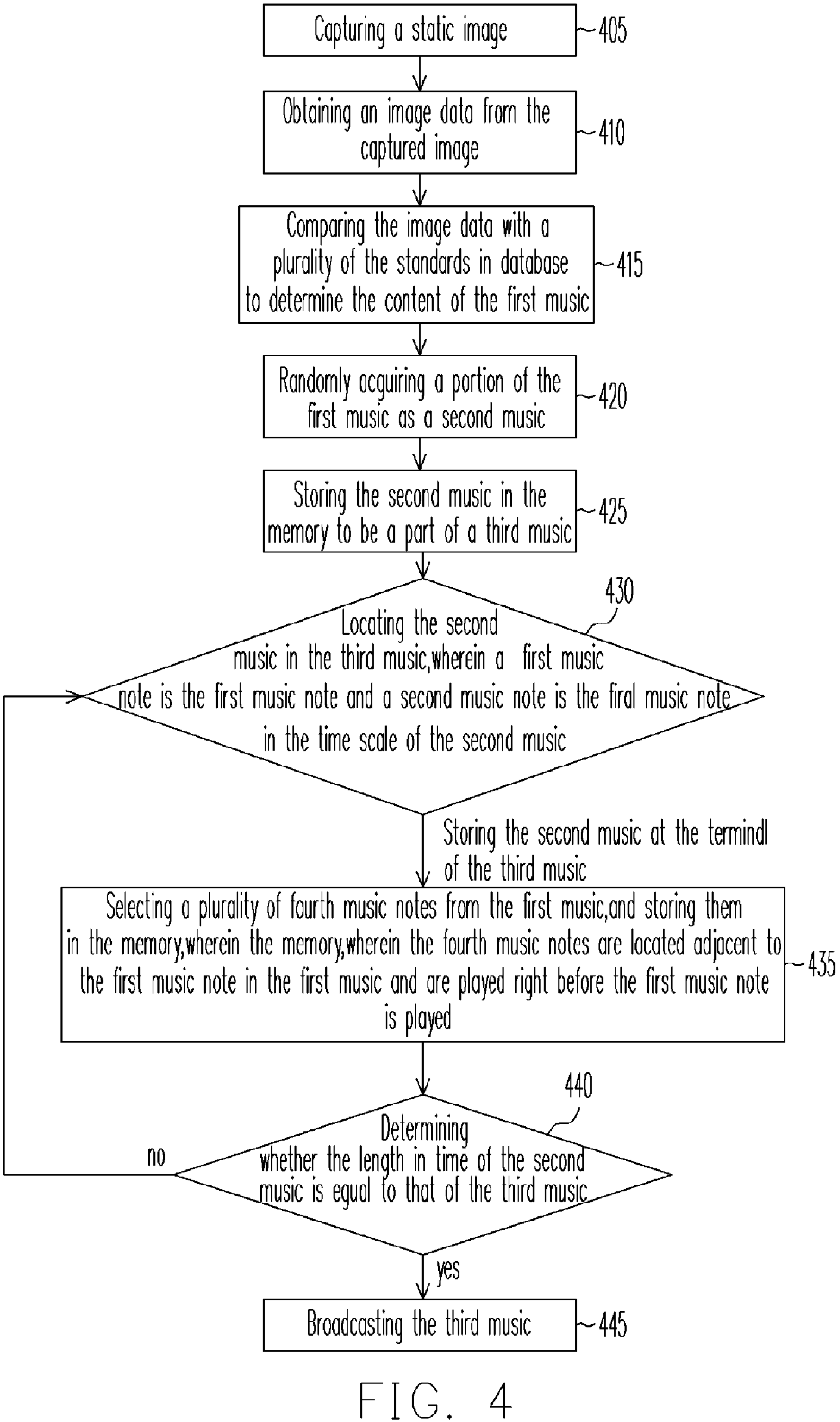
FIG. 4 is a flow chart schematically illustrating a method of transforming static image into music according to a preferred embodiment of the invention.
Figure 5:
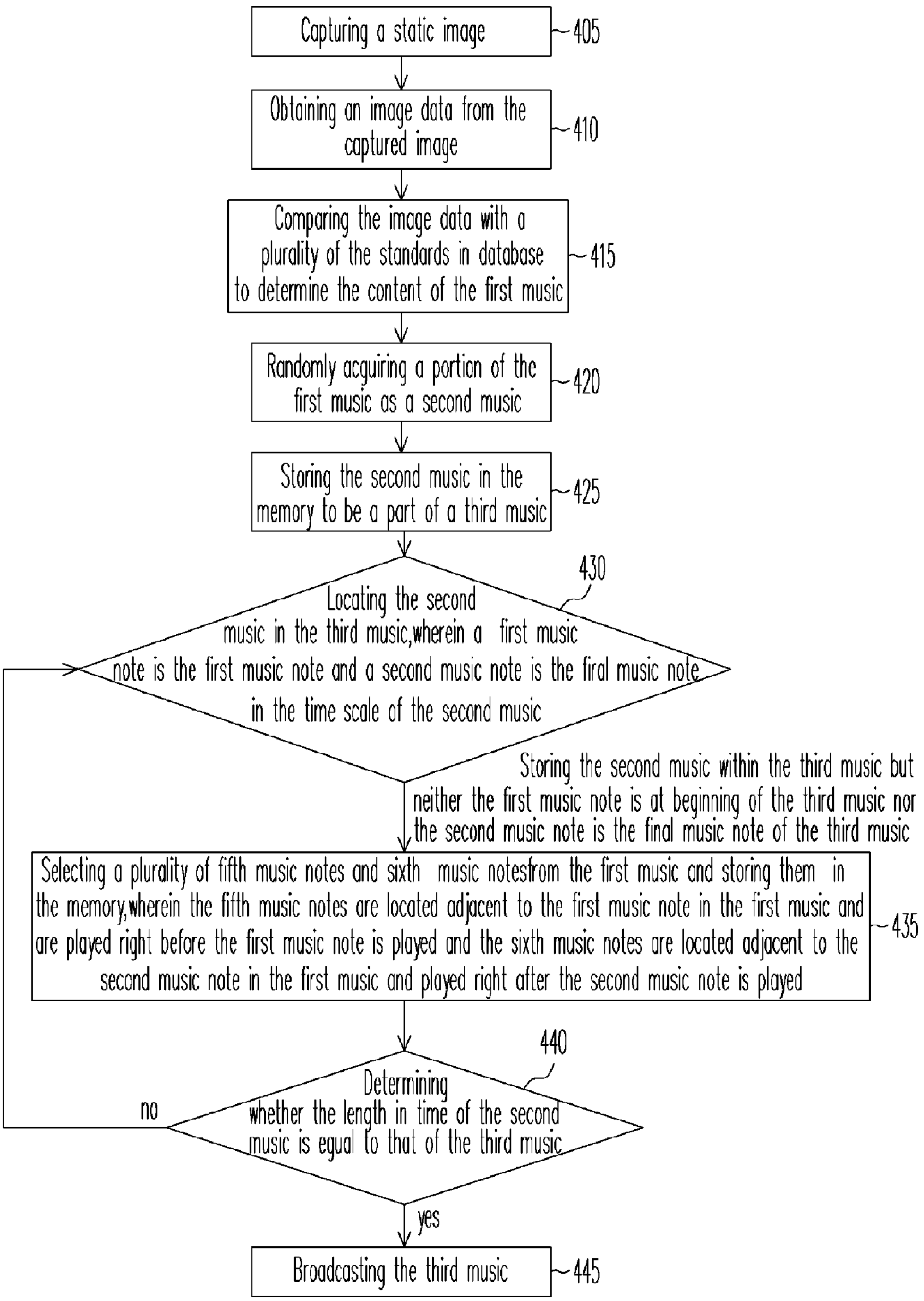
FIG. 5 is a flow chart schematically illustrating a method of transforming dynamic image into music according to a preferred embodiment of the invention.
Figure 6:
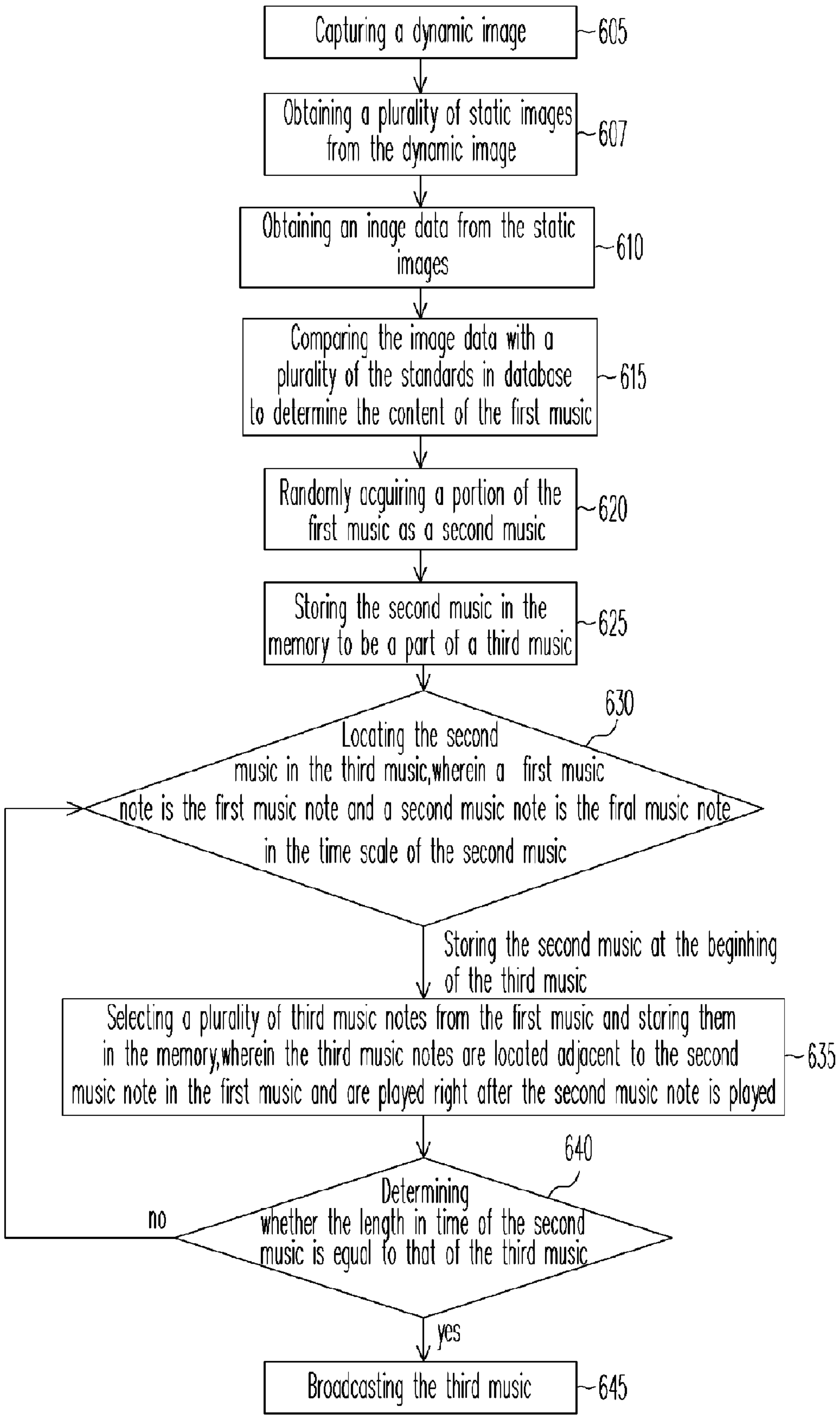
FIG. 6 is a flow chart schematically illustrating a method of transforming dynamic image into music according to a preferred embodiment of the invention.
Figure 7:
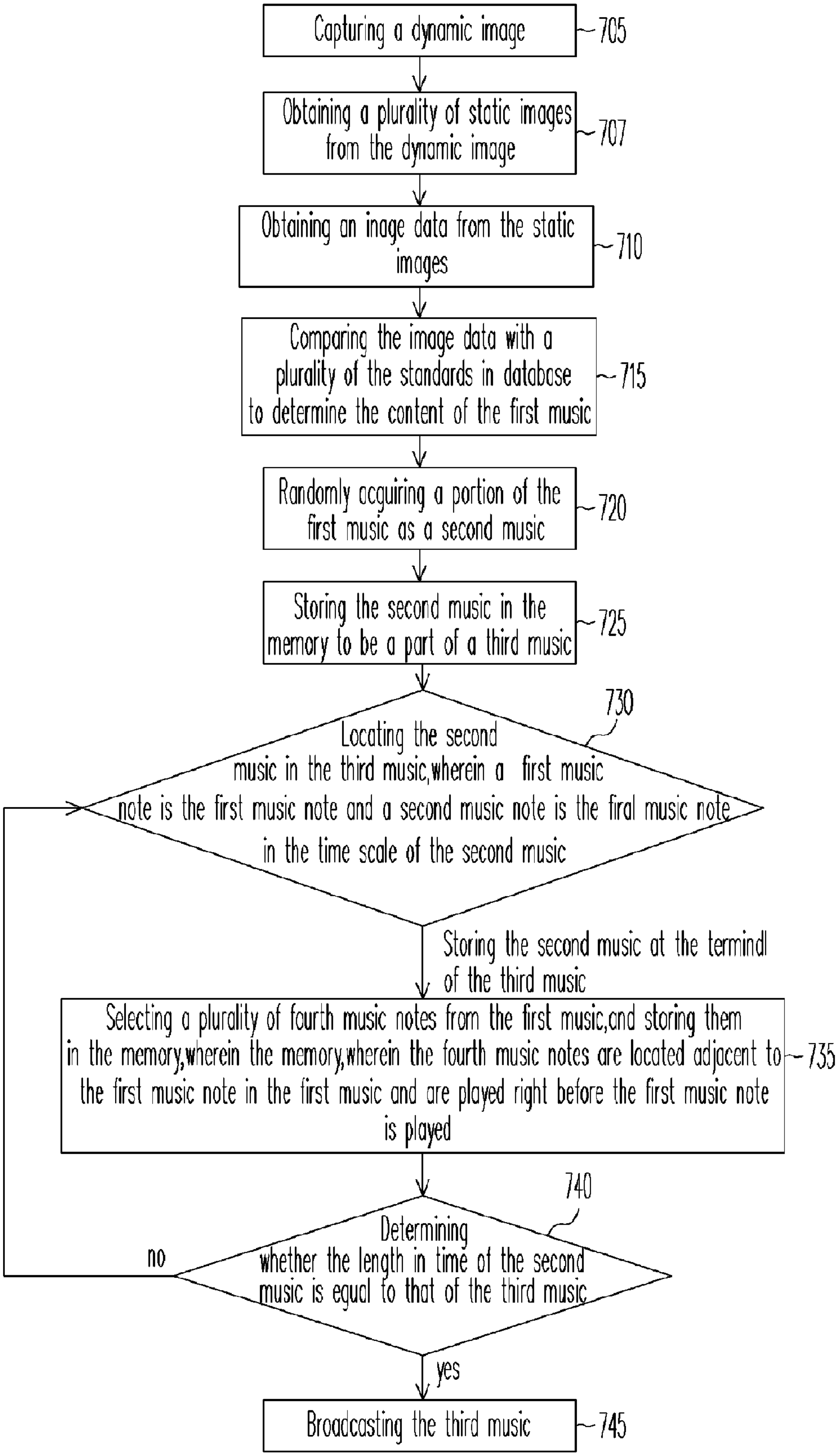
FIG. 7 is a flow chart schematically illustrating a method of transforming dynamic image into music according to a preferred embodiment of the invention.
Figure 8:
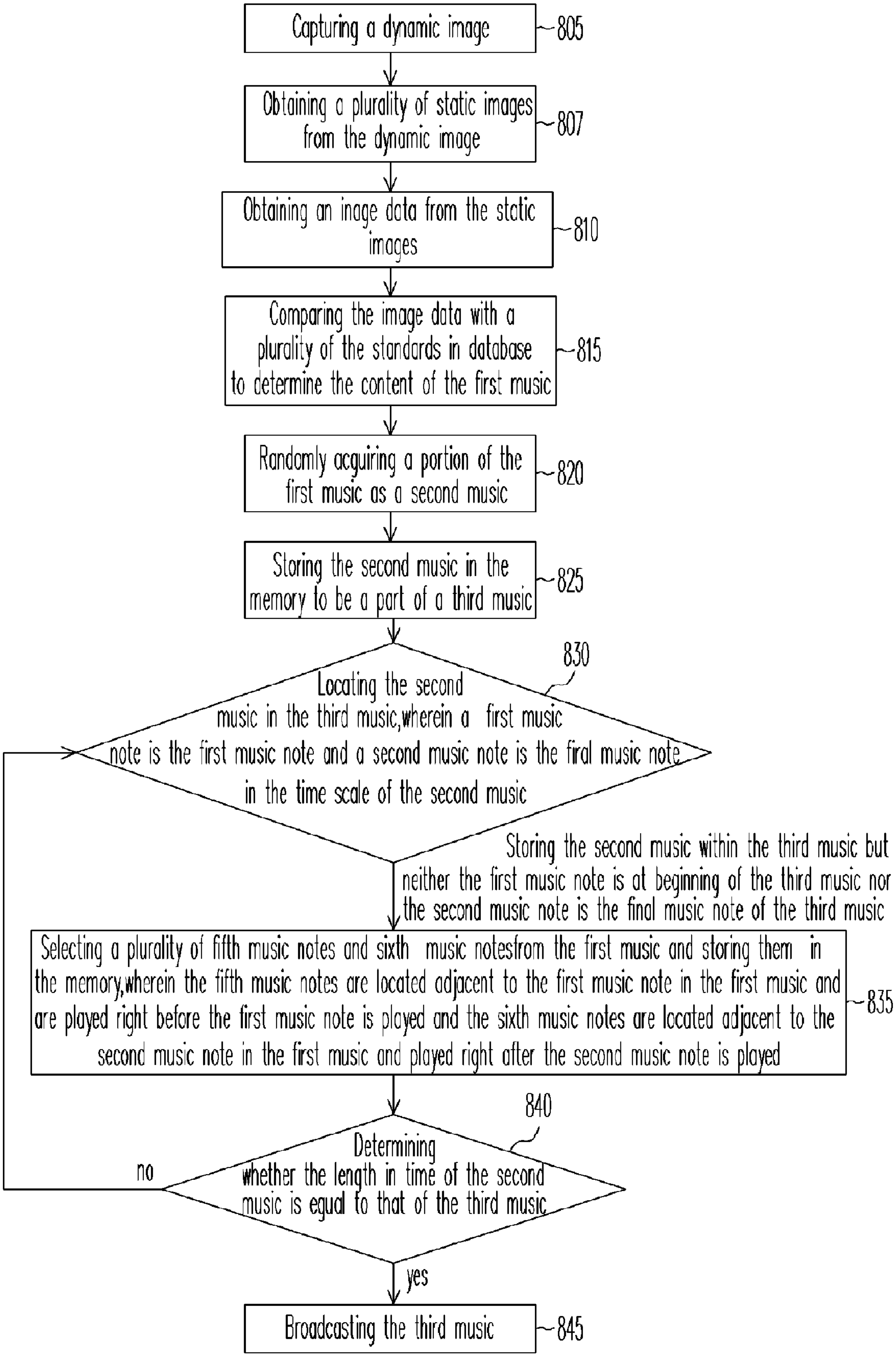
FIG. 8 is a flow chart schematically illustrating a method of transforming dynamic image into music according to a preferred embodiment of the invention.

FIGS. 3, 4 and 5 are flow charts schematically illustrating a method of transforming static image into music according to a first preferred embodiment of the invention. Moreover, FIGS. 6, 7 and 8 are flow charts schematically illustrating a method of transforming static image into music according to a second preferred embodiment of the invention. An image is captured by an image capture apparatus, wherein the image can be, for example, a dynamic image or a static image, and the image capture apparatus can be, for example, photo sensing device or lens. As shown in FIGS. 3, 4 and 5, when the captured image is a static image (steps 305, 405 and 505 in FIGS. 3, 4 and 5, respectively), an image datum can be obtained from the captured image (steps 310, 410 and 510). The image datum can be, for example, an average pixel value or average brightness value or average value of specific pixels of one region in the static image. As shown in FIGS. 6, 7 and 8, when the captured image is a dynamic image (steps 605, 705 and 805 in FIGS. 6, 7 and 8, respectively), a plurality of static images are obtained by analyzing the captured dynamic image (steps 607, 707, 807). Then, an image datum can be obtained from the static images (steps 610, 710 and 810). The image datum can be, for example, an average pixel value or average brightness value or average value of specific pixels of one region in the static image.

The image datum obtained from the dynamic image or static image is compared with a plurality of the standards in the memory. When value of the image datum is between two adjacent standards, the content of a first music is determined (steps 315, 415, 515, 615, 715 and 815). The content of a plurality of the first music can be stored in a memory either the same as or different from where the standards are stored. The first music includes a plurality of consecutive and adjacent music notes. The memory can be, for example, a hard disk or a flash memory card, such as CF card, SD card or XD card. Moreover, the first music can be synthesized by a music-note signal or a rhythm signal, wherein the music-note signal can be sent out by a played music instrument or synthesized from various played music instruments. In the following description of the present invention, the first music is used as music notes, however, the present invention is not limited by this kind of representation.

A portion of content of the first music is randomly acquired to be a second music (steps 320, 420, 520, 620, 720 and 820), wherein the second music includes a plurality of consecutive and adjacent music notes in the portion of the first music. There are many ways to acquire the portion of the first music to be the second music and the method introduced below is one of the embodiments in practice, however, the present invention is not limited by this method. The acquiring method according to one of the embodiment of the invention comprises the steps of dividing the first music into a plurality of sections and then selecting one of the sections to be the second music, wherein a section includes a plurality of consecutive and adjacent music notes. According to different requirements, the length in time of the second music acquired from the first music can be changed with the setting value.

The second music is stored in the memory to be a part of a third music (steps 325, 425, 525, 625, 725 and 825), wherein length in time of the second music can be changed with inserting additional music notes and the length in time of the third music is fixed. The second music and the third music and the content of a plurality of the first music can be store either in the same memory or in the different memory. Since the second music is randomly stored within the third music in the memory, it is necessary to locate the location of the second music in the third music (steps 330, 430, 530, 630, 730 and 830). By selecting one of a first music note from an end point of the second music and a second music note from the other end point of the second music or selecting the first music note and the second music note simultaneously, the third music is finished. The first music note is the first music note in the time scale of the second music and the second music note is the final music note in the time scale of the second music. However, when the second music is stored in a fixed location within the third music in the memory, it is not necessary to perform this determining process.

As shown in FIG. 3 and FIG. 6, when the second music is stored in the memory and the first music note is the first music note played in the time scale of the third music, a plurality of third music notes which are consecutive and adjacent to each other are acquired from the first music to be stored in the memory, wherein the third music notes are located adjacent to the second music note in the first music and are played right after the second music note is played. The third music notes are stored right after the second music and adjacent to the second music note to form a portion of the second music and a portion of the third music (steps 335 and 635), wherein the second music comprises the third music notes. According to different requirements, the number of third music notes acquired from the first music can be changed with the setting value.

The length in time of the second music is determined whether it is equal to that of the third music (steps 340 and 640). When the length in time of the second music is equal to that of the third music, the third music is broadcasted (steps 345 and 645). Otherwise, the serial steps labeled 335 and 340 or the serial steps labeled 635 and 640 are repeated by using the final music note of the current second music as the defined second music note until the length in time of the second music is equal to that of the third music. Then, the third music is broadcasted. The serial steps from step 320/620 to 345/645 can be performed repeatedly on the same static image or dynamic image to obtain different content of the third music to achieve entertainment result.

As shown in FIG. 4 and FIG. 7, when the second music is stored in the memory and the second music note is the final music note played in the time scale of the third music, a plurality of fourth music notes which are consecutive and adjacent to each other are acquired from the first music to be stored in the memory, wherein the fourth music notes are located adjacent to the first music note in the first music and are played right before the first music note is played. The fourth music notes are stored right before the second music and adjacent to the first music note to form a portion of the second music and a portion of the third music (steps 435 and 735), wherein the second music comprises the fourth music notes. According to different requirements, the number of fourth music notes acquired from the first music can be changed with the setting value.

The length in time of the second music is determined whether it is equal to that of the third music (steps 440 and 740). When the length in time of the second music is equal to that of the third music, the third music is broadcasted (steps 445 and 745). Otherwise, the serial steps labeled 435 and 440 or the serial steps labeled 735 and 740 are repeated by using the first music note of the current second music as the defined first music note until the length in time of the second music is equal to that of the third music. Then, the third music is broadcasted. The serial steps from step 420/720 to 445/745 can be performed repeatedly on the same static image or dynamic image to obtain different content of the third music to achieve entertainment result.

As shown in FIG. 5 and FIG. 6, when the second music is stored in the memory and neither the first music note is the first music note played in the time scale of the third music nor the second music note is the final music note played in the time scale of the third music, a plurality of fifth music notes which are consecutive and adjacent to each other are acquired from the first music to be stored in the memory, wherein the fifth music notes are located adjacent to the first music note in the first music and are played right before the first music note is played. Meanwhile, a plurality of sixth music notes which are consecutive and adjacent to each other are acquired from the first music to be stored in the memory, wherein the sixth music notes are located adjacent to the second music note in the first music and are played right after the second music note is played. The fifth music notes are stored right before the second music and adjacent to the first music note and the sixth music notes are stored right after the second music and adjacent to the second music note to form a portion of the second music and a portion of the third music (steps 535 and 835), wherein the second music comprises the fifth and the sixth music notes. According to different requirements, the number of fifth music notes and sixth music notes acquired from the first music can be changed with the setting value.

The length in time of the second music is determined whether it is equal to that of the third music (steps 540 and 840). When the length in time of the second music is equal to that of the third music, the third music is broadcasted (steps 545 and 845). Otherwise, the serial steps labeled 535 and 540 or the serial steps labeled 835 and 840 are repeated by using the first music note and the final music note of the current second music as the defined first music note and the defined second music note respectively until the length in time of the second music is equal to that of the third music. Then, the third music is broadcasted. The serial steps from step 420/720 to 445/745 can be performed repeatedly on the same static image or dynamic image to obtain different content of the third music to achieve entertainment result.

Figure 9:
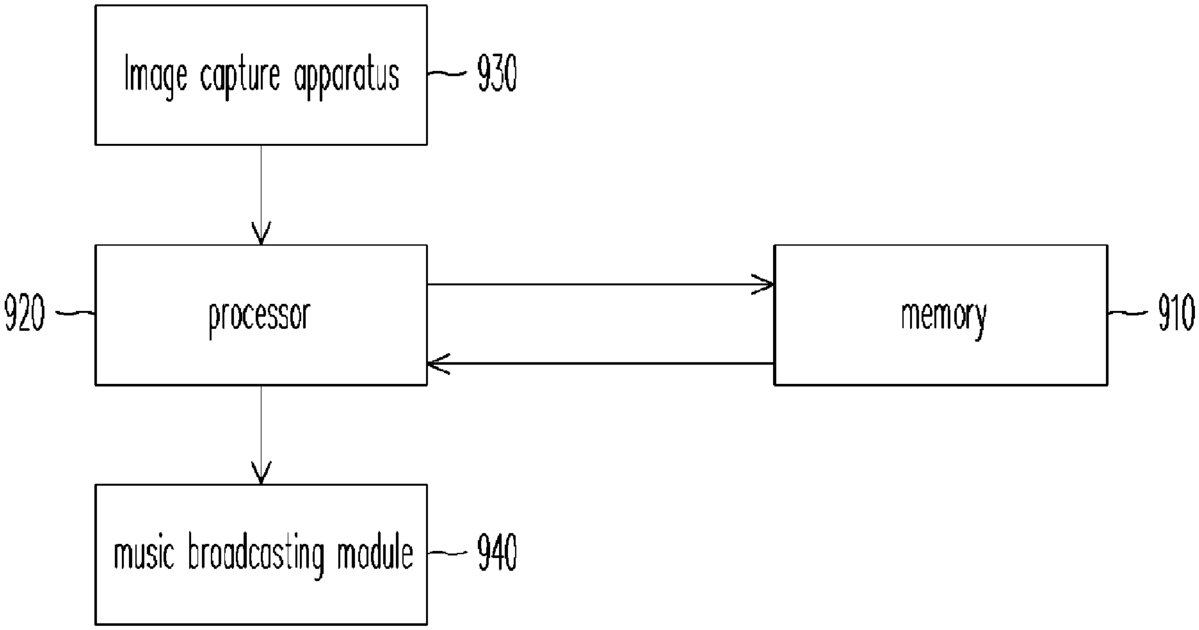
FIG. 9 is a block diagram schematically illustrating a hardware module according to a preferred embodiment of the invention.

FIG. 9 is a block diagram schematically illustrating a hardware module according to a preferred embodiment of the invention. As shown in FIG. 9, in the present invention, a memory 910 is connected to a processor 920, an image capture apparatus 930 is connected to the processor 920 and a music broadcasting module 940 is connected to the processor 920. The memory 910 comprises a plurality of the first music and standards. The image capture apparatus 930 captures an image and an image datum is obtained from the captured image through the processor 920, wherein the captured image can be, for example, a dynamic image or a static image. The processor 920 performs a comparison process, wherein the image datum is compared with the standards stored in the memory 910 to obtain the first music. The first music and the standards can be stored either in the same memory or in different memory. Thereafter, the processor performs a function transforming process for the first music to obtain a melody and then the melody is broadcasted by the music broadcasting module 940.

Altogether, the invention provides a method for transforming image datum into sound and then editing the sound into music. The method comprises steps of capturing a dynamic or static image by an image capture apparatus. The image capture apparatus can be, for example, a photo sensing device or a lens. If the captured image is a static image, an image datum is obtained from the static image. If the captured image is a dynamic image, a plurality of static images can be extracted from the dynamic image and an image datum can be obtained from one of these static images. The obtained image from the captured dynamic image or the captured static image is compared with a plurality of standards in the memory to determine a content of a first music. A portion of the first music is acquired randomly to be a second music, wherein the second music includes a plurality of consecutive and adjacent music notes of a portion of the first music. The second music is stored in the memory to be a part of a third music, wherein the length of the second music in time is changed by inserting additional music notes and the third music possesses a fixed length in time. A location of the second music in the third music is located to determine end points of the second music and then one of a first music note from a first end point of the second music and a second music note from a second end point of the second music is acquired or the first music note and the second music note are acquired simultaneously to finish the third music. The first music note is the first music note in the time scale of the second music and the second music note is the final music note in the time scale of the second music. When the second music is stored in the memory and the first music note is the first music note played in the time scale of the third music, a plurality of third music notes which are consecutive and adjacent to each other are acquired from the first music to be stored in the memory, wherein the third music notes are located adjacent to the second music note in the first music and are played right after the second music note is played. The third music notes are stored right after the second music and adjacent to the second music note to form a portion of the second music and a portion of the third music, wherein the second music comprises the third music notes. The length in time of the second music is determined whether it is equal to that of the third music. When the length in time of the second music is equal to that of the third music, the third music is broadcasted. When the second music is stored in the memory and the second music note is the final music note played in the time scale of the third music, a plurality of fourth music notes which are consecutive and adjacent to each other are acquired from the first music to be stored in the memory, wherein the fourth music notes are located adjacent to the first music note in the first music and are played right before the first music note is played. The fourth music notes are stored right before the second music and adjacent to the first music note to form a portion of the second music and a portion of the third music, wherein the second music comprises the fourth music notes. The length in time of the second music is determined whether it is equal to that of the third music. When the length in time of the second music is equal to that of the third music, the third music is broadcasted. When the second music is stored in the memory and neither the first music note is the first music note played in the time scale of the third music nor the second music note is the final music note played in the time scale of the third music, a plurality of fifth music notes which are consecutive and adjacent to each other are acquired from the first music to be stored in the memory, wherein the fifth music notes are located adjacent to the first music note in the first music and are played right before the first music note is played. Meanwhile, a plurality of sixth music notes which are consecutive and adjacent to each other are acquired from the first music to be stored in the memory, wherein the sixth music notes are located adjacent to the second music note in the first music and are played right after the second music note is played. The fifth music notes are stored right before the second music and adjacent to the first music note and the sixth music notes are stored right after the second music and adjacent to the second music note to form a portion of the second music and a portion of the third music, wherein the second music comprises the fifth and the sixth music notes. The length in time of the second music is determined whether it is equal to that of the third music. When the length in time of the second music is equal to that of the third music, the third music is broadcasted. In the present invention, a dynamic image datum or a static image datum is captured. Thereafter, a comparison process for comparing the data with the content of the memory and a function transforming process are performed to automatically transform and edit image datum into a melody to achieve the goal of entertaining users and to extend the function of the image capture apparatus equipped with the mobile electronic equipment.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for transforming an image datum into music, comprising steps of:

(A) capturing an image by using an image capture apparatus;

(B) obtaining an image datum from the image;

(C) comparing the image datum with a plurality of standards to determine a content of a first music;

(D) randomly acquiring a portion of the content of the first music to form a second music, wherein the second music possesses a first music note and a second music note, and the first music note is the beginning music note in a time scale of the second music and the second music note is the final music note in the time scale of the second music;

(E) storing the second music as a part of a third music, wherein a length in time of the second music is changeable and a length in time of the third music is unchangeable;

(F) acquiring a plurality of third music notes from the first music and storing the third music notes right after the second music and adjacent to the second music note, wherein the third music notes are consecutive and adjacent to each other and are located adjacent to the second music note and are played right after the second music note is played in the first music;

(G) determining the length in time of the second music and comparing the length in time of the second music with the length in time of the third music; and (H) broadcasting the third music when the length in time of the second music is equal to the length in time of the third music.

2. The method of claim 1, wherein the image captured by the image capture apparatus can be a static image.

3. The method of claim 1, wherein the image captured by the image capture apparatus can be a dynamic image and a plurality of static images can be obtained from the dynamic image.

4. The method of claim 3, wherein the image datum can be obtained from the static images.

5. The method of claim 1, wherein the image datum can be an average pixel value of the image.

6. The method of claim 1, wherein the image datum can be an average brightness value of the image.

7. The method of claim 1, wherein in step G, if the length in time of the second music is less than the length in time of the third music, steps from D to G are repeated.

8. The method of claim 1, wherein the first music includes a rhythm signal.

9. The method of claim 1, wherein in step E, the first music note is a music note played first.

10. A method for transforming an image datum into music, comprising steps of:

(A) capturing an image by using an image capture apparatus;

(B) obtaining an image datum from the image;

(C) comparing the image datum with a plurality of standards to determine a content of a first music;

(D) randomly acquiring a portion of the content of the first music to form a second music, wherein the second music possesses a first music note and a second music note, and the first music note is the beginning music note in a time scale of the second music and the second music note is the final music note in the time scale of the second music;

(E) storing the second music as a part of a third music, wherein a length in time of the second music is changeable and a length in time of the third music is unchangeable;

(F) acquiring a plurality of fourth music notes from the first music and storing the fourth music notes right before the second music and adjacent to the first music note, wherein the fourth music notes are consecutive and adjacent to each other and are located adjacent to the first music note and are played right before the second music note is played in the first music;

(G) determining the length in time of the second music and comparing the length in time of the second music with the length in time of the third music; and (H) broadcasting the third music when the length in time of the second music is equal to the length in time of the third music.

11. The method of claim 10, wherein the image captured by the image capture apparatus can be a static image.

12. The method of claim 10, wherein the image captured by the image capture apparatus can be a dynamic image and a plurality of static images can be obtained from the dynamic image.

13. The method of claim 12, wherein the image datum can be obtained from the static images.

14. The method of claim 10, wherein the image datum can be an average pixel value of the image.

15. The method of claim 10, wherein the image datum can be an average brightness value of the image.

16. The method of claim 10, wherein in step G, if the length in time of the second music is less than the length in time of the third music, steps from D to G are repeated.

17. The method of claim 10, wherein the content of the first music includes music-notes signals produced by a music instrument.

18. The method of claim 10, wherein in step E, the second music note is a music note played latest.

19. A method for transforming an image datum into music, comprising steps of:

(A) capturing an image by using an image capture apparatus;

(B) obtaining an image datum from the image;

(C) comparing the image datum with a plurality of standards to determine a content of a first music;

(D) randomly acquiring a portion of the content of the first music to form a second music, wherein the second music possesses a first music note and a second music note, and the first music note is the beginning music note in a time scale of the second music and the second music note is the final music note in the time scale of the second music;

(E) storing the second music as a part of a third music, wherein a length in time of the second music is changeable and a length in time of the third music is unchangeable;

(F) acquiring a plurality of fifth music notes and a plurality of the sixth music notes from the first music and storing the fifth music notes right before the second music and adjacent to the first music note and storing the sixth music notes right after the second music and adjacent to the second music note, wherein the fifth music notes are consecutive and adjacent to each other and the sixth music notes are consecutive and adjacent to each other and the fifth music note are located adjacent to the first music note and are played right before the second music note is played in the first music and the sixth music note are located adjacent to the second music note and are played right after the second music note is played in the first music;

(G) determining the length in time of the second music and comparing the length in time of the second music with the length in time of the third music; and (H) broadcasting the third music when the length in time of the second music is equal to the length in time of the third music.

20. The method of claim 19, wherein the image captured by the image capture apparatus can be a static image.

21. The method of claim 19, wherein the image captured by the image capture apparatus can be a dynamic image and a plurality of static images can be obtained from the dynamic image.

22. The method of claim 21, wherein the image datum can be obtained from the static images.

23. The method of claim 19, wherein the image datum can be an average pixel value of the image.

24. The method of claim 19, wherein the image datum can be an average brightness value of the image.

25. The method of claim 19, wherein in step G, if the length in time of the second music is less than the length in time of the third music, steps from D to G are repeated.

26. The method of claim 19, wherein the content of the first music includes music-notes signals synthesized from various music instruments.

27. The method of claim 19, wherein in step E, neither the first music note is a beginning music note of the third music nor the second music note is a final music note of the third music.

* * * * *